(12) United States Patent
Ang et al.

(10) Patent No.: US 10,690,799 B2
(45) Date of Patent: Jun. 23, 2020

(54) ANTENNA SHIELD DESIGN FOR OPTIMIZED EM WAVE PROPAGATION IN RESISTIVITY LOGGING TOOLS

(71) Applicant: HALLIBURTON ENERGY SERVICES, INC., Houston, TX (US)

(72) Inventors: Lay Wei Ang, Singapore (SG); Minh Dang Nguyen, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 175 days.

(21) Appl. No.: 15/853,002

(22) Filed: Dec. 22, 2017

(65) Prior Publication Data

US 2019/0196048 A1 Jun. 27, 2019

(51) Int. Cl.
*G01V 3/28* (2006.01)
*G01V 3/30* (2006.01)

(52) U.S. Cl.
CPC . *G01V 3/28* (2013.01); *G01V 3/30* (2013.01)

(58) Field of Classification Search
USPC .............................................. 324/338–346
See application file for complete search history.

(56) References Cited

U.S. PATENT DOCUMENTS

| | | | |
|---|---|---|---|
| 6,351,127 B1* | 2/2002 | Rosthal | G01V 3/28 324/338 |
| 6,566,881 B2* | 5/2003 | Omeragic | G01V 3/28 324/338 |
| 2011/0074427 A1* | 3/2011 | Wang | G01V 3/30 324/339 |
| 2014/0292340 A1* | 10/2014 | Yang | G01V 3/28 324/338 |
| 2015/0061682 A1* | 3/2015 | Homan | E21B 47/102 324/339 |

* cited by examiner

*Primary Examiner* — Tung X Nguyen
*Assistant Examiner* — Robert P Alejnikov, Jr.

(57) ABSTRACT

A resistivity logging tool includes a resistivity antenna and an antenna shield having a longitudinal slot segments interconnected to form an elongated slot with an elongated slot length that is longer than the length of the sleeve in which the slot segments are formed thereby enhancing electromagnetic wave strength propagated through the shield. Longitudinal slot segments may be interleaved to maximize the total number of elongated slots.

18 Claims, 8 Drawing Sheets

ANTENNA SHIELD DESIGN FOR OPTIMIZED EM WAVE PROPAGATION IN RESISTIVITY LOGGING TOOLS

TECHNICAL FIELD

The present disclosure generally relates to oilfield equipment and, in particular, to downhole tools, drilling and related systems and techniques for using electromagnetic antennas in downhole applications. More specifically, the disclosure relates to an antenna shield for use in resistivity logging tools.

BACKGROUND

The basic principles and techniques for electromagnetic logging for earth formations are well known. For example, induction logging to determine the resistivity (or its inverse, conductivity) of earth formations adjacent a borehole has long been a standard and important technique in the search for and recovery of subterranean petroleum deposits. In brief, a transmitter transmits via an antenna an electromagnetic (EM) signal that passes through formation materials around the borehole and induces a signal in one or more receivers. The amplitude and/or phase of the receiver signals are influenced by the formation resistivity, enabling resistivity measurements to be made. The measured signal characteristics and/or formation properties calculated therefrom are recorded as a function of the tool's depth or position in the borehole, yielding a formation log that can be used by analysts.

In order to protect the EM antenna from the mechanical stresses of drilling, the antenna is typically encased by an antenna shield. The antenna shield typically takes the form of a metal enclosure with adjacent apertures, slots or openings to allow the EM signal to propagate through the shield.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Generally, an antenna shield for an electromagnetic resistivity logging tool is provided. The tool includes a resistivity antenna mounted on a tool body and configured to transmit and/or receive electromagnetic waves. The antenna shield is deployed on the tool body about the EM antenna. The shield is formed of a conductive sleeve having a plurality of parallel slot segments formed in the sleeve. The parallel slot segments are generally longitudinal in the same direction as the major axis of the tool body. Transverse slot segments join adjacent parallel slots segments to form an elongated slot with an overall elongated slot length determined by the combined length of the parallel and transverse slot segments. In some embodiments, the overall elongated slot length is greater than the longitudinal length of the sleeve. In some embodiments, two elongated slots may be nested, whereby their respective transverse slot segments are on opposing ends of the sleeve. The overall elongated slot length maintains transmission efficiency for an EM wave to propagate through the shield, while the sleeve retains mechanical strength to protect the EM antenna.

Figure 1:
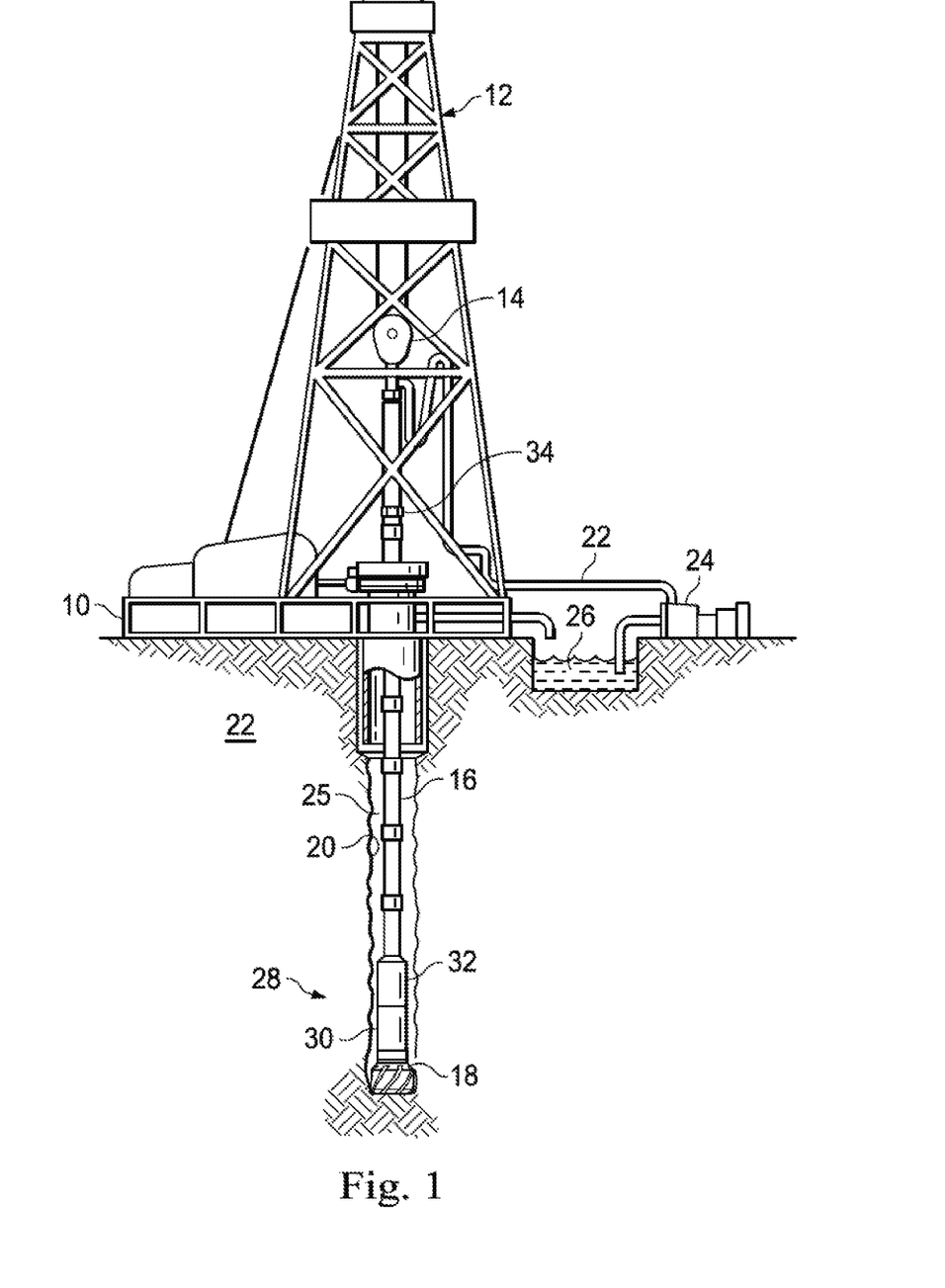
FIG. 1 illustrates an electromagnetic logging tool utilized in a logging while drilling environment.

The disclosed tool configurations and operations are best understood in the context of the larger systems in which they operate. Accordingly, an illustrative measurement while drilling (MWD) and/or logging while drilling (LWD) environment is shown in FIG. 1. A drilling platform 10 supports a derrick 12 having a traveling block 14 for raising and lowering pipe strings such as drill string 16. A drill bit 18 carried on drill string 16 may be driven by a downhole motor and/or rotation of the drill string 16. As bit 18 rotates, it creates a borehole 20 in formation 22. A pump 24 circulates drilling fluid downhole through the interior of drill string 16, through orifices in drill bit 18, back to the surface via the annulus 25 formed between borehole 20 and drill string 16, and into a retention tank 26. The drilling fluid transports cuttings from the borehole 20 into the tank 26 and aids in maintaining the borehole integrity.

An electromagnetic (EM) resistivity logging tool 30 is carried by drill string 16. In some embodiments, resistivity tool 30 is integrated into the bottom-hole assembly 28, near drill bit 18. As the drill bit 18 extends the borehole 20 through the formation 22, resistivity logging tool 30 may be activated to collect measurements relating to various formation properties, as well as the tool orientation and position and various other drilling conditions. The resistivity logging tool 30 may take the form of a drill collar, i.e., a thick-walled tubular that provides weight and rigidity to aid the drilling process. A telemetry sub 32 may be included to transfer tool measurements to a surface receiver 34 and to receive commands from the surface receiver.

Figure 2:
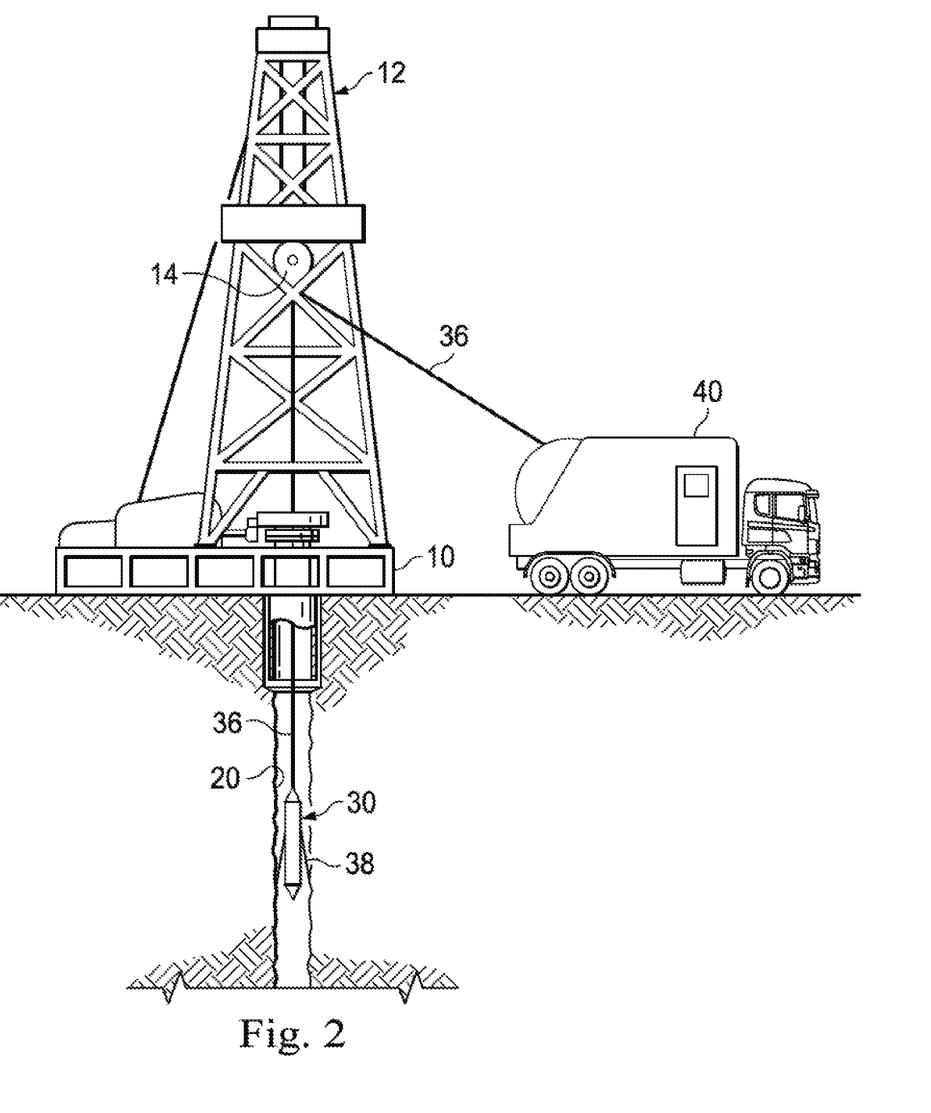
FIG. 2 illustrates an electromagnetic logging tool utilized in a wireline logging environment.

As shown in FIG. 2, rather than deploying resistivity logging tool 30 on a drill string for use in LWD and/or MWD operations, resistivity logging tool 30 may be deployed into borehole 20 on another conveyance mechanism 36, such as a wireline, slickline, cable, coiled tubing or other tubing string. Thus, in FIG. 2, a cable 36 is utilized to lower resistivity logging tool 30 into borehole 20. Cable 36 may include conductors for transporting power to resistivity logging tool 30 and telemetry from resistivity logging tool 30 to the surface. Resistivity logging tool 30 may have centralizing arms 38 that center the tool 30 within the borehole 20 as the tool is pulled uphole. A logging facility 40 collects measurements from resistivity logging tool 30, and may include computing facilities for processing and storing the measurements gathered by the logging tool 30.

Figure 3:
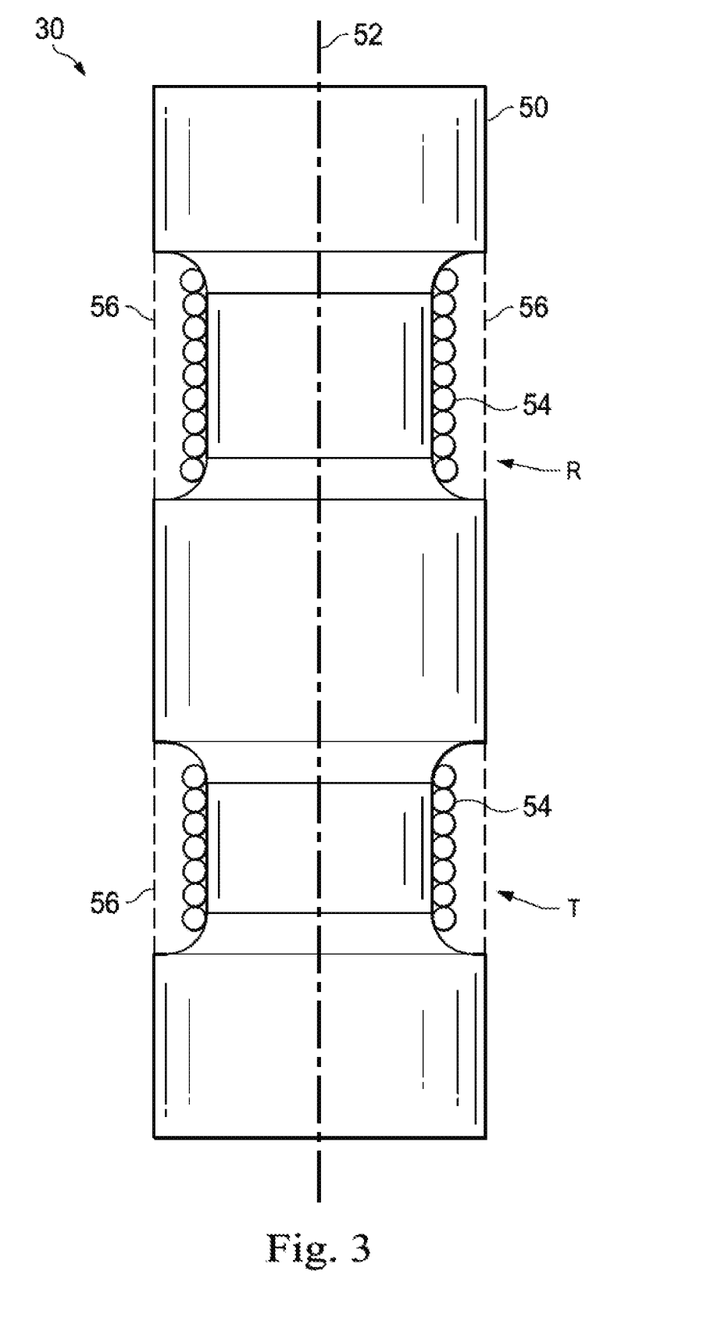
FIG. 3 illustrates an electromagnetic logging tool.

Turning to FIG. 3, resistivity logging tool 30 generally includes a tool body 50, a portion of which is illustrated, and is characterized by a longitudinal axis 52. One or more resistivity antennae 54 are carried on tool body 50. The disclosure is not limited to a particular type, number or orientation of antennae 54, nor the manner in which antenna 54 is mounted on tool body 50. As such, an antenna 54 may be omni-directional or unidirectional. Notwithstanding the foregoing, in FIG. 3, antenna 54 are illustrated as an axially spaced transmitting antenna T and a receiving antenna R deployed on a tool body 50, although any antenna 54 may be configured to transmit and/or receive electromagnetic waves. In any case, disposed adjacent to antenna 54 on tool body 50 is an antenna shield 56.

Figure 4:
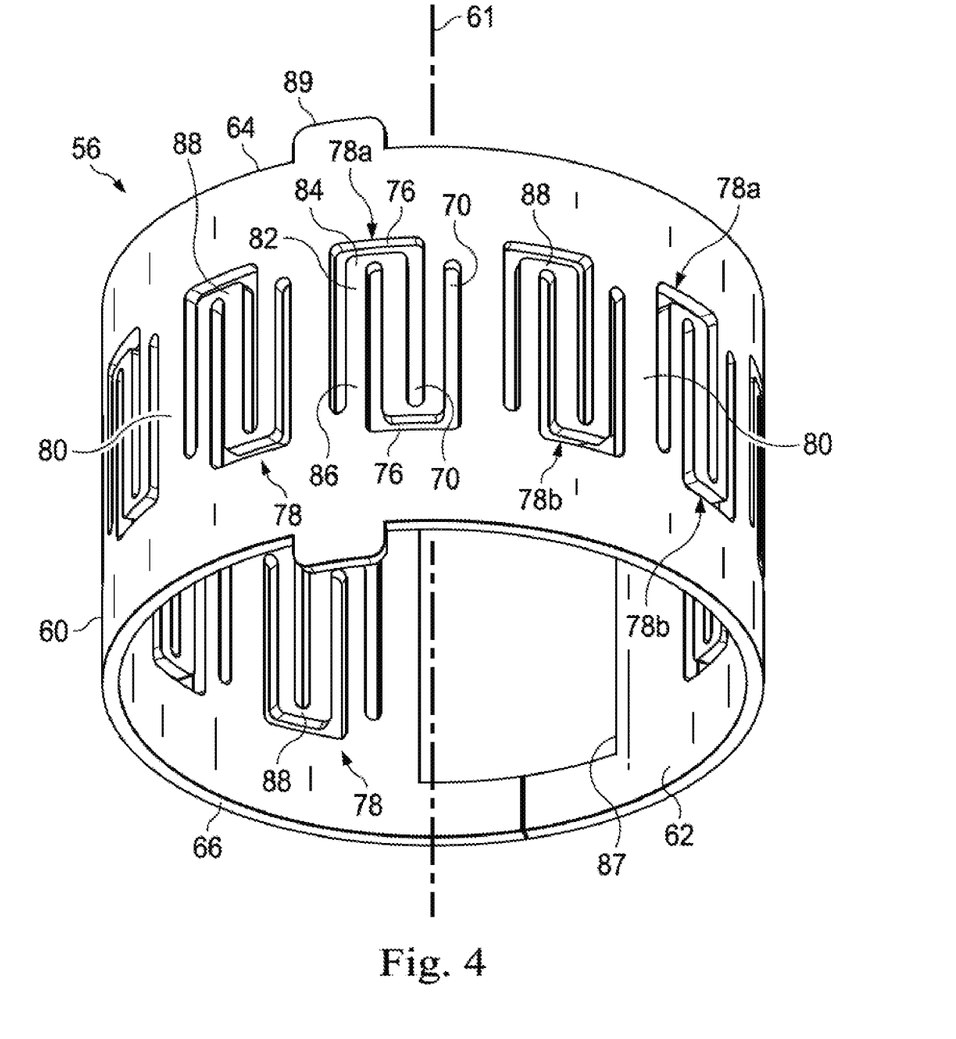
FIG. 4 illustrates an antenna shield with elongated slot design for optimized EM wave propagation.
Figure 5:
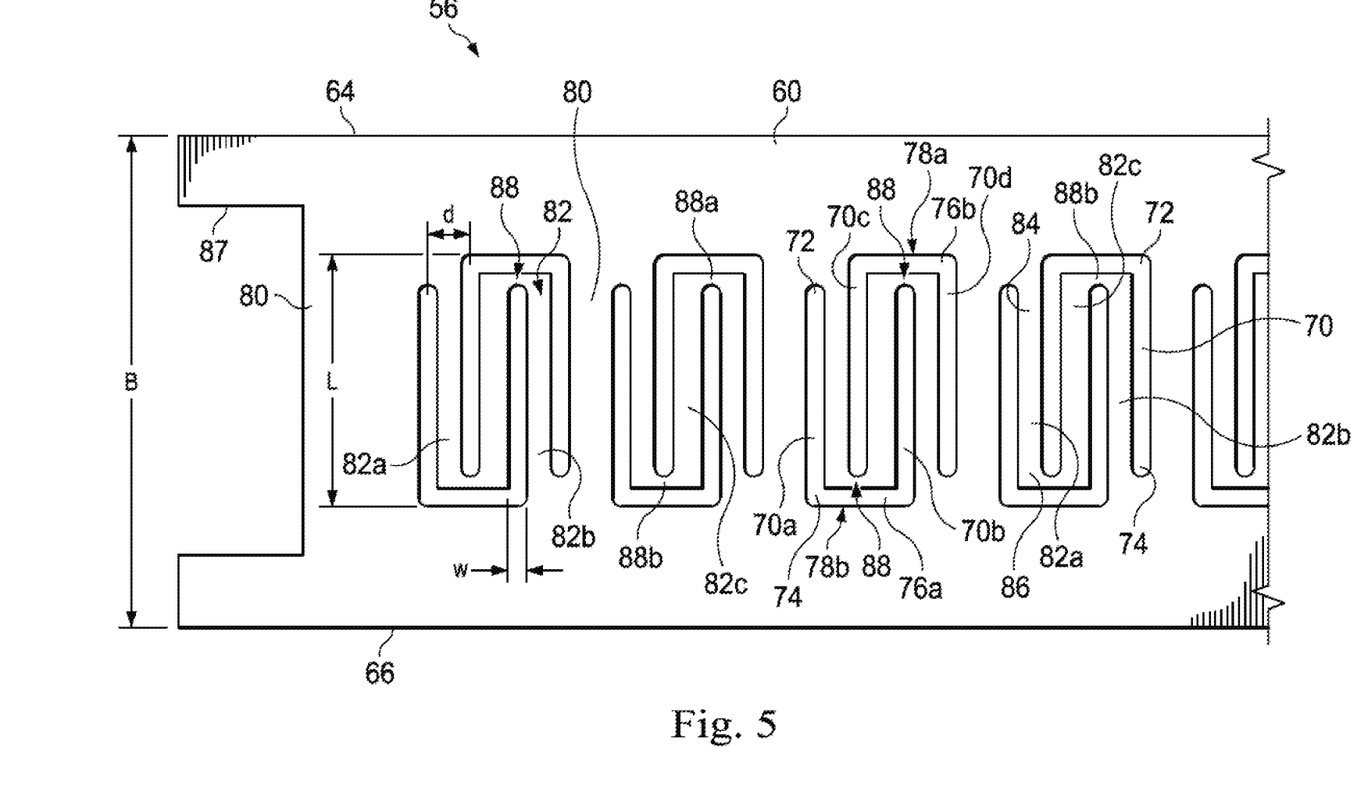
FIG. 5 illustrates the antenna shield of FIG. 4 in a flattened configuration.

FIGS. 4 and 5 illustrate one embodiment of antenna shield 56 in which apertures or slots are interleaved. In some embodiments, antenna shield 56 is formed of a metallic or conductive sleeve 60 extending along an axis 61 that is parallel with longitudinal axis 52 of tool body 50 when shield 56 is mounted thereon (see FIG. 3). Sleeve 60 includes a sleeve wall 62 extending between a first sleeve end 64 and a second sleeve end 66.

Figure 6:
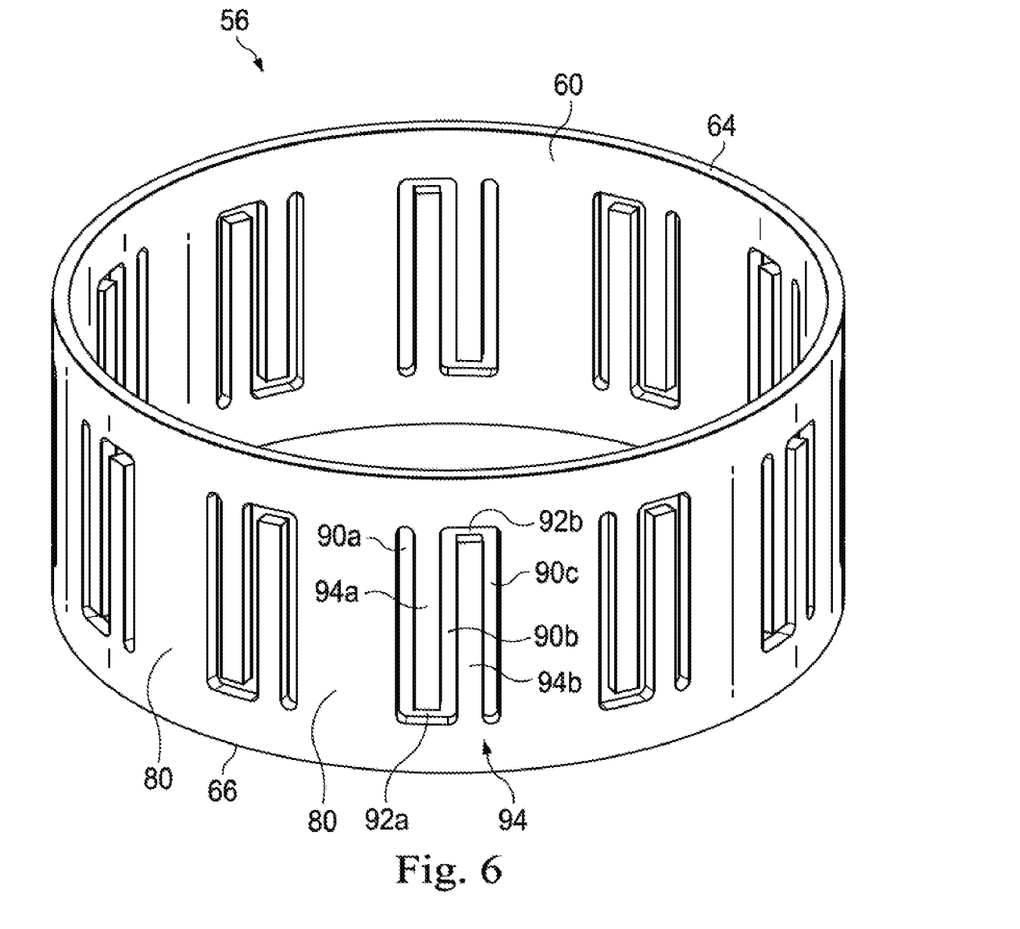
FIG. 6 illustrates another embodiment of the antenna shield of FIG. 4.

Spaced apart longitudinal slot segments 70 are formed in sleeve wall 62, the longitudinal slot segments 70 extending from adjacent one of the sleeve ends 64, 66 to adjacent the other sleeve end 64, 66. In one or more embodiments, longitudinal slot segments 70 extend substantially parallel to one another and substantially parallel with axis 61 of sleeve 60. In order to maintain the structural integrity and strength of sleeve 110, longitudinal slot segments 70 do not extend to either sleeve end 64, 118. Each longitudinal slot segment 70 may be characterized as having a first end 72 and a second end 74. At least two longitudinal slot segments 70 are joined or interconnected by a transverse slot segment 76, thereby forming an elongated slot 78 with an overall elongated slot length determined by the combined length of the longitudinal slot segments 70 and the transverse slot segment 76. This is true regardless of the longitudinal slot segments 70 and transverse slot segments 76 forming any particular elongated slot 78. In one or more preferred embodiments, a transverse slot segment 76 interconnects a pair of longitudinal slot segments 70 at their distal ends 74 (see elongated slot 78a), while in other embodiments, the transverse slot segment 128 may be positioned between the first and second ends 72, 74, respectively, of the longitudinal slot segments 70 (not shown). In one or more embodiments, three or more longitudinal slot segments 70 may be interconnected by transverse slot segments 76 (see FIG. 6). Any two or more longitudinal slot segments 70 interconnected by one or more transverse slot segments 76 may be grouped together as desired to form an elongated slot 78.

In FIGS. 4 and 5, a first elongated slot 78a and a second elongated slot 78b are illustrated as interleaved. In particular, first elongated slot 78a is formed of a first longitudinal slot segment 70a spaced apart from a second longitudinal slot segment 70b and interconnected by a first transverse slot segment 76a. Slot segments 70a and 70b are interconnected at their respective second ends 74, which may also be characterized as their distal ends relative to first sleeve end 64. Likewise, second elongated slot 78b is formed of a third longitudinal slot segment 70c spaced apart from a fourth longitudinal slot segment 70d and interconnected by a second transverse slot segment 76b. In particular, slots segments 70c and 70d are interconnected at their respective first ends 72, which may also be characterized as their proximal ends relative to first sleeve end 64. While FIGS. 4 and 5 illustrated elongated slots 78a, 78b as interleaved, in other embodiments, elongated slots 78a, 78b may be side by side (not shown), in which case transverse slot segments 76 may be at the same end of elongated slots 78a, 78b. In any event, as shown, a first elongated slot 78a formed in the sleeve wall 60 and extending from adjacent the first sleeve end 64 while a second elongated slot 78a formed in the sleeve wall 60 and extending from adjacent the second sleeve end 66, each of the longitudinal slot segments forming an elongated slot 78 joined at their distal ends by a transverse slot segment 76. In this case, the first and second elongated slots 78a, 78b are nested or interleaved so that one longitudinal slot segment 70a of the first elongated slot 78a extends between adjacent longitudinal slot segments 70c of the second elongated slot 78b.

Moreover, in embodiments where elongated slots 78a, 78b are side by side as described above, the interconnecting transverse slot segment 76 of each elongated slot 78 may be at the same ends or alternating ends, such a first transverse slot segment 76a interconnecting the first ends 72 of a first elongated slot 78a and a second transverse slot segment 76b interconnecting the second ends 74 of a second elongated slot 78b. Likewise, in the case where three or more longitudinal slot segments 70 are interconnected by transverse slot segments 76, the longitudinal slot segments 70 may, in some embodiments, be interconnected at alternating ends of the longitudinal slot segments 70. Thus, a first longitudinal slot segment 70a and second longitudinal slot segment 70b may be interconnected at a distal or second end 74 of the longitudinal slot segment 70, while an additional longitudinal slot segment 70 may be interconnected by a transverse slot segment 76 at the proximal or first end 72 of the longitudinal slot segments 70.

Extending between the first and second sleeve ends 64, 66 between one or more slot sets is a support column 80 formed by the sleeve wall 60. In preferred embodiments, a support column 80 bounds each elongated slot 78. In one or more embodiments, support columns 80 are generally parallel with the axis 61 of the sleeve 60 and the longitudinal slot segments 70 of an elongated slot 78 and interconnect the first and second sleeve ends 64, 66 to provide structural rigidity and strength to antenna shield 56.

With ongoing reference to FIGS. 4 and 5, it will be appreciated that any given set of adjacent slot segments 70 form a finger 82 therebetween, each finger 82 having a first proximal end 84 and a second distal end 86, the first proximal end 82 being adjacent one of the two sleeve ends 64, 66. In the case where two elongated slots 78 are interleaved as shown, then a first finger 82a extends from adjacent first sleeve end 64 and a second finger 82b extends from the second sleeve end 66. It will be appreciated that in the case of adjacent fingers 82 that extend from opposite ends of sleeve 60, such as the case of fingers 82a, 82b extending from opposite ends 64, 66, respectively, then fingers 82a, 82b may be interconnected at their respective second distal ends 86 by a transverse arm 88. In some embodiments, transverse arm 88 may include a first transverse portion 88a extending from the end 84 of a first finger 82a, a second transverse portion 88b extending from the end 86 of a second finger 82b and an interconnecting finger 82c extending between the first and second transverse portions 88a, 88b. In such case, the interconnecting finger 82c may be parallel to the first finger 82a and the second finger 82b.

Shield 56 may include a notch 87 formed in sleeve 60 and/or tabs 89 to accommodate alignment and attachment of shield 56 to tool body 50.

Figure 7:
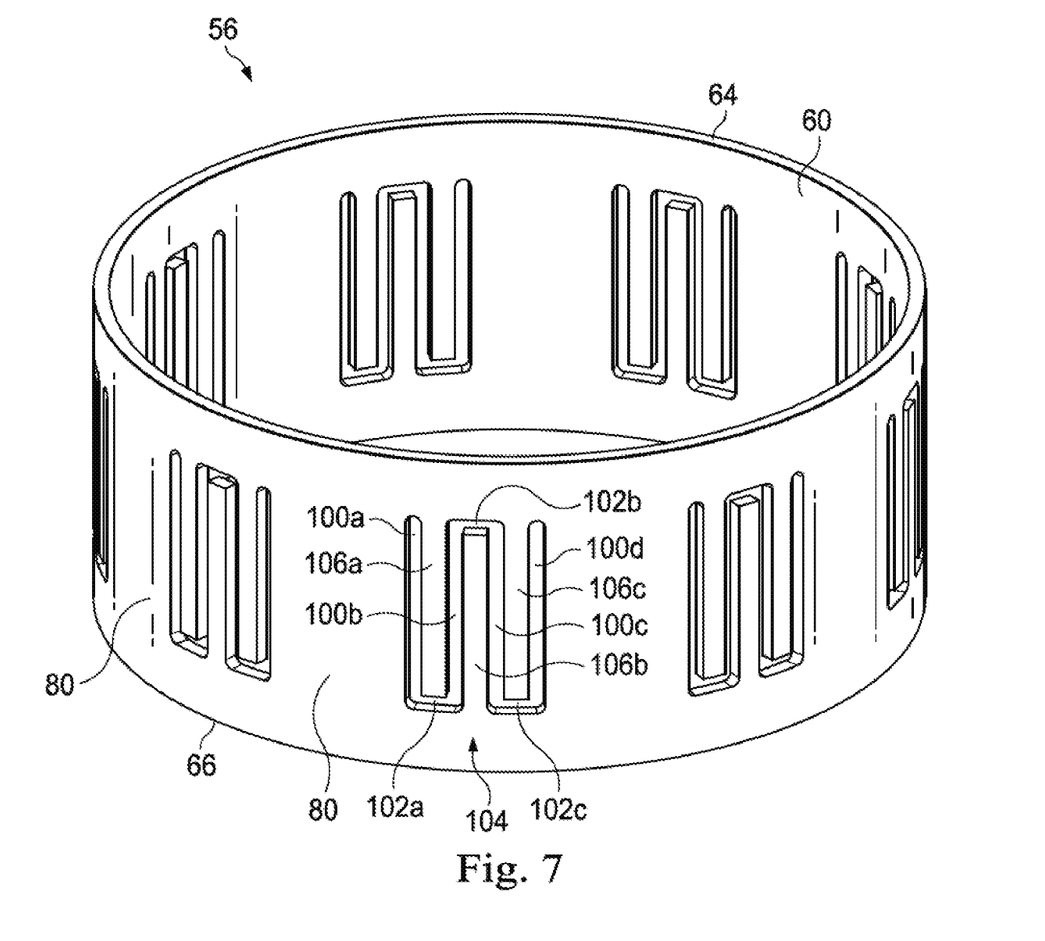
FIG. 7 illustrates another embodiment of the antenna shield of FIG. 4.
Figure 8:
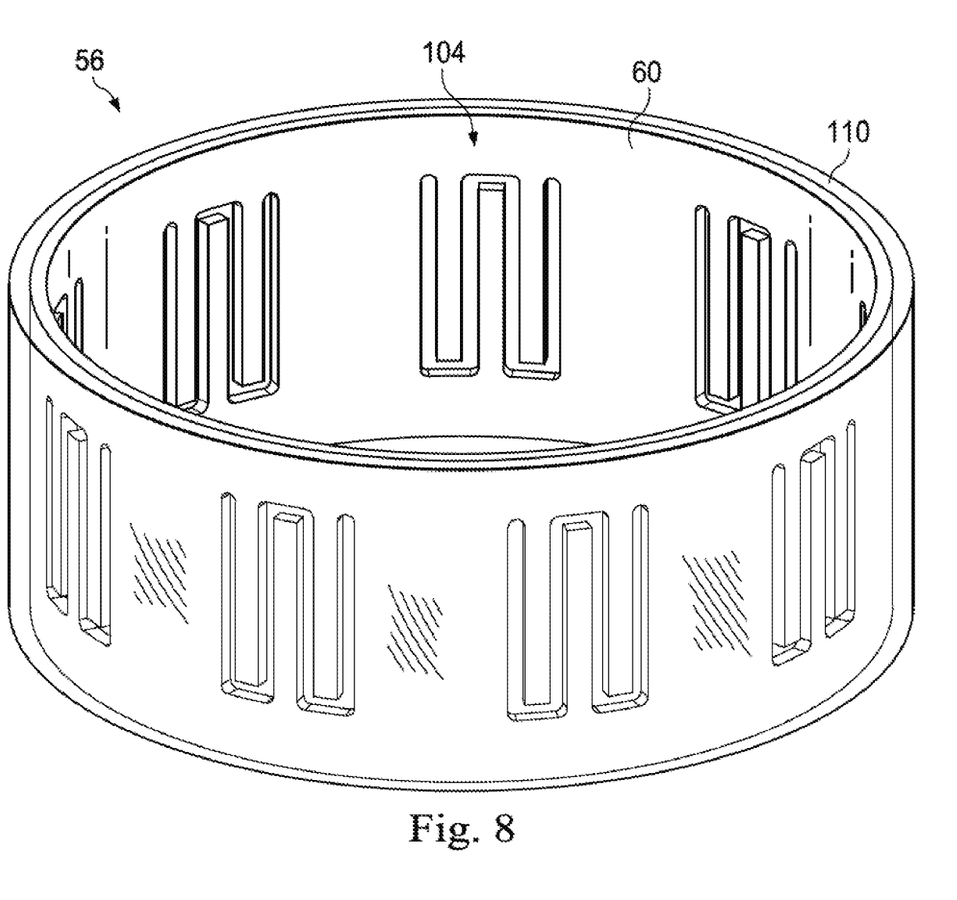
FIG. 8 illustrates the antenna shield of FIG. 7 with an additional protective sleeve disposed thereon.

FIGS. 7 and 8 illustrate alternative embodiments of shield 56, where three or more longitudinal slot segments are interconnected. Specifically, in FIG. 7, three longitudinal slot segments 90a, 90b and 90c are interconnected by two transverse slot segments 92a and 92b so as to form one elongated slot 94. As shown, the geometry of elongated slot 94 is characterized by substantially parallel slot segments 90a, 90b and 90c interconnected at opposing ends by transverse slot segments 92a, 92b that results in a first finger 94a extending from adjacent sleeve end 64 and a second finger 94b extending from adjacent sleeve end 66. Similarly, in FIG. 8, four longitudinal slot segments 100a, 100b, 100c and 100d are interconnected by three transverse slot segments 102a, 102b, and 102c so as to form one elongated slot 104. As shown, the geometry of elongated slot 104 is characterized by substantially parallel slot segments 100a, 100b, 100c, and 100d interconnected at opposing ends by transverse slot segments 102a, 102b and 102c that results in a first finger 106a extending from adjacent sleeve end 64, a second finger 106b extending from adjacent sleeve end 66 and a third finder 106c extending from adjacent sleeve end 64.

The key concept is to increase the overall length of any given slot or aperture by summing the discrete lengths of the segments. Thus, in FIG. 5, two longitudinal slot segments are summed in the case of each of the interleaved elongated slots, such that n=2. In this design, the breadth (B) of the metal enclosure can be maintained and does not need to be lengthened in order to increase the overall elongated slot length. This means that the space for other electronics and sensors to be mounted on the tool body 50 should not be sacrificed or adversely affected, while enabling EM waves to pass through the shield more effectively. It will be appreciated that the slots (apertures) cause turbulence in the mud flow downhole. Thus, if the width (w) were simply increased, it would worsen the effect of turbulence and erosion downhole, which could cause reliability problems and reduce the life of the mechanical parts. Moreover, simply increasing the width (w) does not have a strong impact on increasing the efficiency of the EM wave propagation. In fact, it has been found that increasing L has a much more significant impact on the EM wave strength.

Thus, in order to mitigate the constraints of space, mechanical strength, and EM wave strength, the slot or aperture is designed in such a way that it combines 2 or more apertures segments into one nonlinear aperture of length (n*L+n*d) where L is the length of the original aperture, d is the distance between adjacent apertures and n is the number of apertures combined. Standard prior art shielding effectiveness is estimated at $SE_{db}=20\ \log_{10}(\lambda/2L)$, where λ=wavelength, and L=longest dimension of the slot. Thus it can be appreciated that the slot length L can be no more than the overall longitudinal length of the shield sleeve between the two ends of the sleeve.

In the shield disclosed herein, within the same physical space of the sleeve, the elongated slot length becomes n*(L+d). Thus, the shielding effectiveness is expected to be $SE_{db}=20\ \log_{10}(\lambda/(nL+nd))$, where d is the distance of transverse slot segment, and n is the number of longitudinal slot segments. Thus, the EM wave strength propagated is estimated to be increased exponentially with the number of aperture segments combined. Notably, in FIG. 4, n=2; in FIG. 6, n=3; while in FIG. 7, n=4.

As can be appreciated that in the prior art, traditionally an increase in the number of slots (apertures) without changing the shape of the slots or without combining the slots, the increase in the EM wave strength is by simple addition. In contrast, by increasing the overall slot/aperture length as described herein, the EM wave strength is increased by an exponential factor, which is much more significant.

Finally, an alternative embodiment of shield 56 is illustrated in FIG. 8, where an additional EM transparent sleeve 110 is provided around the underlying sleeve 60 to strengthen the robustness of the elongated slots 104 formed in sleeve 60. The additional sleeve 110 may be formed of an EM transparent material, such as for example, a thermoplastic polymer which may include polyether ether ketones (PEEKs), polytetrafluoroethylene (PTFE), other plastics or elastic material, such a rubber. Any impact force or pressure from downhole applied externally to the EM shield 56 is merely transferred into compressive stress, which is particularly suitable for downhole conditions.

Thus, a shield for a downhole resistivity tool has been described. A dowhole resistivity tool may generally include a resistivity tool body having a longitudinal axis; a resistivity antenna deployed on the tool body, the antenna configured to transmit and/or receive electromagnetic waves; and an antenna shield deployed on the tool body about the antenna, the shield comprising a sleeve having a sleeve wall extending between a first sleeve end and second sleeve end; a first set of two longitudinal slot segments formed in the sleeve wall and extending from adjacent the first sleeve end, each longitudinal slot segment having a length, the longitudinal slot segments joined at their distal ends by a transverse slot segment so as to form an elongated slot with an overall elongated slot length determined by the combined length each the longitudinal slot segments and a transverse slot segment length; and a support column formed by the sleeve wall, the support column substantially parallel with at least one of the longitudinal slot segments of the first set and interconnecting the first and second sleeve ends. In other embodiments, the resistivity tool may include a resistivity tool body having a longitudinal axis; a resistivity antenna deployed on the tool body, the antenna configured to transmit and/or receive electromagnetic waves; and an antenna shield deployed on the tool body about the antenna, the shield comprising a sleeve having a first sleeve end and a second sleeve end with two spaced apart fingers formed in the sleeve between the two ends, each finger extending from adjacent an opposite end of the sleeve, the fingers each including a finger end that is electrically connected to an adjacent finger end by a transverse arm, the fingers being substantially parallel with the longitudinal axis of the tool body. In yet other embodiments, the resistivity tool may include a resistivity tool body having a longitudinal axis; a resistivity antenna deployed on the tool body, the antenna configured to transmit and/or receive electromagnetic waves; and a metallic antenna shield deployed on the tool body about the antenna, the shield comprising a sleeve having a sleeve wall extending between a first sleeve end and second sleeve end; first and second spaced apart support columns formed by the sleeve wall, the support columns substantially parallel with one another and interconnecting the first and second sleeve ends; first and second spaced apart, longitudinal slot segments formed in the sleeve between the support columns and between the two sleeve ends; and a transverse slot segment interconnecting a distal end of a first slot segment and a distal end of a second slot segment so as to form a finger between the first and second slot segments.

For any of the foregoing embodiments, the downhole resistivity tool may include any one of the following elements, alone or in combination with each other:

a second set of two longitudinal slot segments formed in the sleeve wall and extending from adjacent the second sleeve end, the two longitudinal slot segments of the second set joined at their distal ends by a transverse slot segment;

one longitudinal slot segment of the first set extends between the two longitudinal slot segments of the second set;

a first slot of the first set of slots is positioned adjacent a first slot of the second set of slots so as to define a first finger having a distal end; a second slot of the first set of slots is positioned adjacent a second slot of the second set of slots so as to define a second finger having a distal end; and a transverse arm interconnecting the distal end of the first finger with the distal end of the second finger;

the second set of two longitudinal slot segments is spaced apart from the first set with the support column extending between the two sets;

the sleeve is conductive;

a non-conductive sleeve disposed around at least a portion of the periphery of the conductive sleeve;

the non-conductive sleeve is formed of a material selected from the group consisting of a thermoplastic polymer, polyether ether ketones, polytetrafluoroethylene, plastics, elastic material and rubber;

the transverse arm comprises a first transverse portion extending from the end of a first finger, a second transverse portion extending from the end of a second finger; and an interconnecting finger extending between the first and second transverse portions;

a support column formed by the sleeve, the support column substantially parallel with the fingers and interconnecting the first and second sleeve ends;

a plurality of finger groups spaced apart from one another about the perimeter of the sleeve, wherein each finger group comprises at least two spaced apart fingers formed in the sleeve between the two sleeve ends, each finger extending from adjacent an opposite end of the sleeve, the fingers each including a finger end that is electrically connected to an adjacent finger end by a transverse arm having a first transverse portion extending from the end of a first finger, a second transverse portion extending from the end of a second finger and an interconnecting finger extending between the first and second transverse portions;

the sleeve is conductive, and further comprising a non-conductive sleeve disposed around at least a portion of the periphery of the conductive sleeve, wherein the non-conductive sleeve is formed of a material selected from the group consisting of a thermoplastic polymer, polyether ether ketones, polytetrafluoroethylene, plastics, elastic material and rubber;

a third longitudinal slot segment formed in the sleeve between the support columns and between the two sleeve ends; and a transverse slot segment interconnecting a proximal end of the second slot segment and a proximal end of the third slot segment so as to form a finger between the second and third slot segments;

a fourth longitudinal slot segment formed in the sleeve between the support columns and between the two sleeve ends; and a transverse slot segment interconnecting a distal end of the third slot segment and a distal end of the fourth slot segment so as to form a finger between the third and fourth slot segments;

third and fourth spaced apart, longitudinal slot segments formed in the sleeve between the support columns and between the two sleeve ends, the third and fourth longitudinal slot segments each having a proximal end adjacent the distal ends of the first and second longitudinal slot segments; and a transverse slot interconnecting a distal end of the third slot segment and a distal end of the fourth slot segment;

the first, second, third and fourth slots are interleaved;

the sleeve extends along a sleeve axis that is substantially parallel with the longitudinal axis of the tool body, and wherein the longitudinal slot segments and the finger formed there between are substantially parallel with the sleeve axis;

a plurality of spaced apart, longitudinal slot segments formed in the sleeve between the support columns and between the two sleeve ends; and a plurality of transverse slot segments, wherein a transverse slot segment interconnects adjacent slot segments at alternating ends of the sleeve so as to form elongated fingers between adjacent slot segments, the fingers alternatingly extending from the first and second sleeve ends.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A downhole resistivity tool comprising:
a resistivity tool body having a longitudinal axis;
a resistivity antenna deployed on the tool body; and
an antenna shield deployed on the tool body about the antenna, the shield comprising a sleeve having an electrically conductive sleeve wall with opposing first and second sleeve ends defining first and second continuous circumferential bands; a first set of two longitudinal slot segments through the sleeve wall each extending from a first slot end adjacent the first sleeve end to a second slot end adjacent the second sleeve end, the longitudinal slot segments joined at their second sleeve ends by a transverse slot segment; and a support column defined by the electrically conductive sleeve wall, the support column extending fully from the continuous circumferential band defined by the first sleeve end to the continuous circumferential band defined by second sleeve end such that the first and second continuous circumferential bands are electrically connected to one another through the support column.

2. The tool of claim 1, further comprising a second set of two longitudinal slot segments through the sleeve wall and each extending from a first slot end adjacent the second sleeve end to a second slot end adjacent the first sleeve end, the two longitudinal slot segments of the second set joined at their second ends by a transverse slot segment.

3. The tool of claim 2, wherein one longitudinal slot segment of the first set extends between the two longitudinal slot segments of the second set.

4. The tool of claim 3, wherein a first slot of the first set of slots is positioned adjacent a first slot of the second set of slots so as to define a first finger extending between a first and second ends of the first finger; a second slot of the first set of slots is positioned adjacent a second slot of the second set of slots so as to define a second finger extending between first and second ends of the second finger; and a transverse arm interconnecting an end of the first finger to an adjacent end of the second finger.

5. The tool of claim 2, wherein the second set of two longitudinal slot segments is spaced apart from the first set with the support column extending between the two sets.

6. The tool of claim 1, the longitudinal slot segments joined at their second sleeve ends by a transverse slot segment so as to form an elongated slot with an overall elongated slot length determined by the combined length each the longitudinal slot segments and a transverse slot segment length, the overall slot length being greater than the length of the sleeve between sleeve ends.

7. The tool of claim 6, wherein the sleeve is conductive, said tool further comprising a non-conductive sleeve disposed around at least a portion of the periphery of the conductive sleeve.

8. The tool of claim 7, wherein the non-conductive sleeve is formed of a material selected from the group consisting of a thermoplastic polymer, polyether ether ketones, polytetrafluoroethylene, plastics, elastic material and rubber.

9. A downhole resistivity tool comprising:
a resistivity tool body having a longitudinal axis;
a resistivity antenna deployed on the tool body; and
an antenna shield deployed on the tool body about the antenna, the shield comprising an electrically conductive sleeve having opposing first and second sleeve ends with two spaced apart fingers formed in the sleeve axially between the opposing sleeve ends and transverse slot segments and circumferentially between adjacent longitudinal slot segments, each finger extending from adjacent an opposite sleeve end, the fingers each including an electrically conductive finger end that is electrically connected to an adjacent finger end by a transverse arm, the fingers being substantially parallel with the longitudinal axis of the tool body.

10. The tool of claim 9, wherein the transverse arm comprises a first transverse portion extending from the end of a first finger, a second transverse portion extending from the end of a second finger; and an interconnecting finger extending between the first and second transverse portions.

11. The tool of claim 9, further comprising a support column formed by the sleeve, the support column substantially parallel with the fingers and extending fully from the first sleeve end to the second sleeve end.

12. The tool of claim 9, comprising a plurality of finger groups spaced apart from one another about the perimeter of the sleeve, wherein each finger group comprises at least two spaced apart fingers formed in the sleeve between the opposing sleeve ends, each alternating finger extending from adjacent an opposite sleeve end, the fingers each including a finger end that is electrically connected to an adjacent finger end by a transverse arm having a first transverse portion extending from the end of a first finger, a second transverse portion extending from the end of a second finger and an interconnecting finger extending between the first and second transverse portions.

13. The tool of claim 9, wherein the sleeve is conductive, and further comprising a non-conductive sleeve disposed around at least a portion of the periphery of the conductive sleeve, wherein the non-conductive sleeve is formed of a material selected from the group consisting of a thermoplastic polymer, polyether ether ketones, polytetrafluoroethylene, plastics, elastic material and rubber.

14. An antenna assembly for a downhole resistivity tool having a resistivity tool body defined along a longitudinal axis, the antenna assembly comprising:
a resistivity antenna deployed on the tool body; and
a metallic antenna shield deployed on the tool body about the antenna, the shield comprising a sleeve having a sleeve wall with opposing first and second sleeve ends; first and second spaced apart support columns formed by the sleeve wall, the support columns substantially parallel with one another and extending fully from the first sleeve end to the second sleeve end;
first and second spaced apart, longitudinal slot segments formed through the sleeve wall and between the support columns, each slot segment extending from a first slot end adjacent one sleeve end to a second slot end adjacent the opposing sleeve end; a transverse slot segment interconnecting an end of the first slot segment and an end of the second slot segment so as to form a finger between the first and second slot segments; third and fourth spaced apart, longitudinal slot segments formed through the sleeve wall between the support columns, the third and fourth longitudinal slot segment extending from a first slot end adjacent one sleeve end to a second slot end adjacent the opposing sleeve end; and a transverse slot interconnecting an end of the third slot segment and an end of the fourth slot segment, wherein the first, second, third and fourth slots are interleaved.

15. The antenna assembly of claim 14, further comprising a third longitudinal slot segment formed through the sleeve wall between the support columns, the third longitudinal slot segment extending from a first slot end adjacent one sleeve end to a second slot end adjacent the opposing sleeve end; and a transverse slot segment interconnecting an end of the second slot segment and an end of the third slot segment so as to form a finger between the second and third slot segments.

16. The antenna assembly of claim 15, further comprising a fourth longitudinal slot segment formed through the sleeve wall between the support columns, the fourth longitudinal slot segment extending from a first slot end adjacent one sleeve end to a second slot end adjacent the opposing sleeve end; and a transverse slot segment interconnecting an end of the third slot segment and an end of the fourth slot segment so as to form a finger between the third and fourth slot segments.

17. The antenna assembly of claim 14, wherein the sleeve extends along a sleeve axis that is substantially parallel with the longitudinal axis of the tool body, and wherein the longitudinal slot segments and the finger formed there between are substantially parallel with the sleeve axis.

18. The antenna assembly of claim 14, further comprising a plurality of spaced apart, longitudinal slot segments formed through the sleeve wall between the support columns, each longitudinal slot segment extending from a first slot end adjacent one sleeve end to a second slot end adjacent the opposing sleeve end; and a plurality of transverse slot segments, wherein a transverse slot segment interconnects adjacent slot segments ends at alternating ends of the sleeve so as to form elongated fingers between adjacent slot segments, the fingers alternatingly extending from adjacent the first and second sleeve ends.

* * * * *